Jan. 29, 1963 R. L. RICHARDSON 3,075,597
TORSION BALANCE HAVING MECHANICALLY AMPLIFIED INDICATOR
Filed Aug. 3, 1960 4 Sheets-Sheet 1
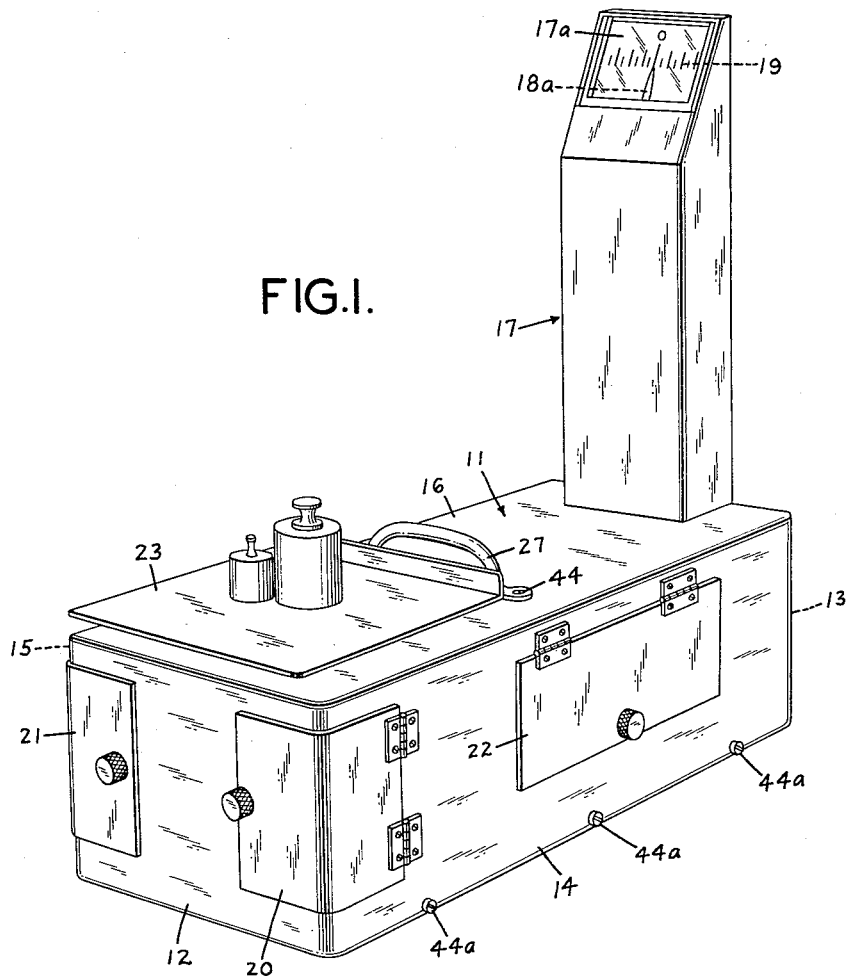
FIG.I.
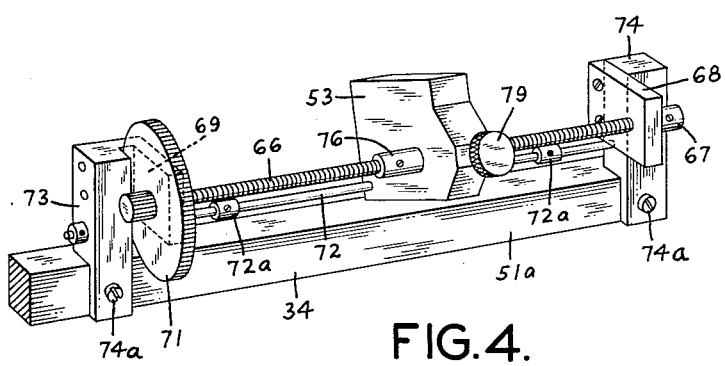
FIG.4.

Jan. 29, 1963 R. L. RICHARDSON 3,075,597
TORSION BALANCE HAVING MECHANICALLY AMPLIFIED INDICATOR
Filed Aug. 3, 1960 4 Sheets-Sheet 2
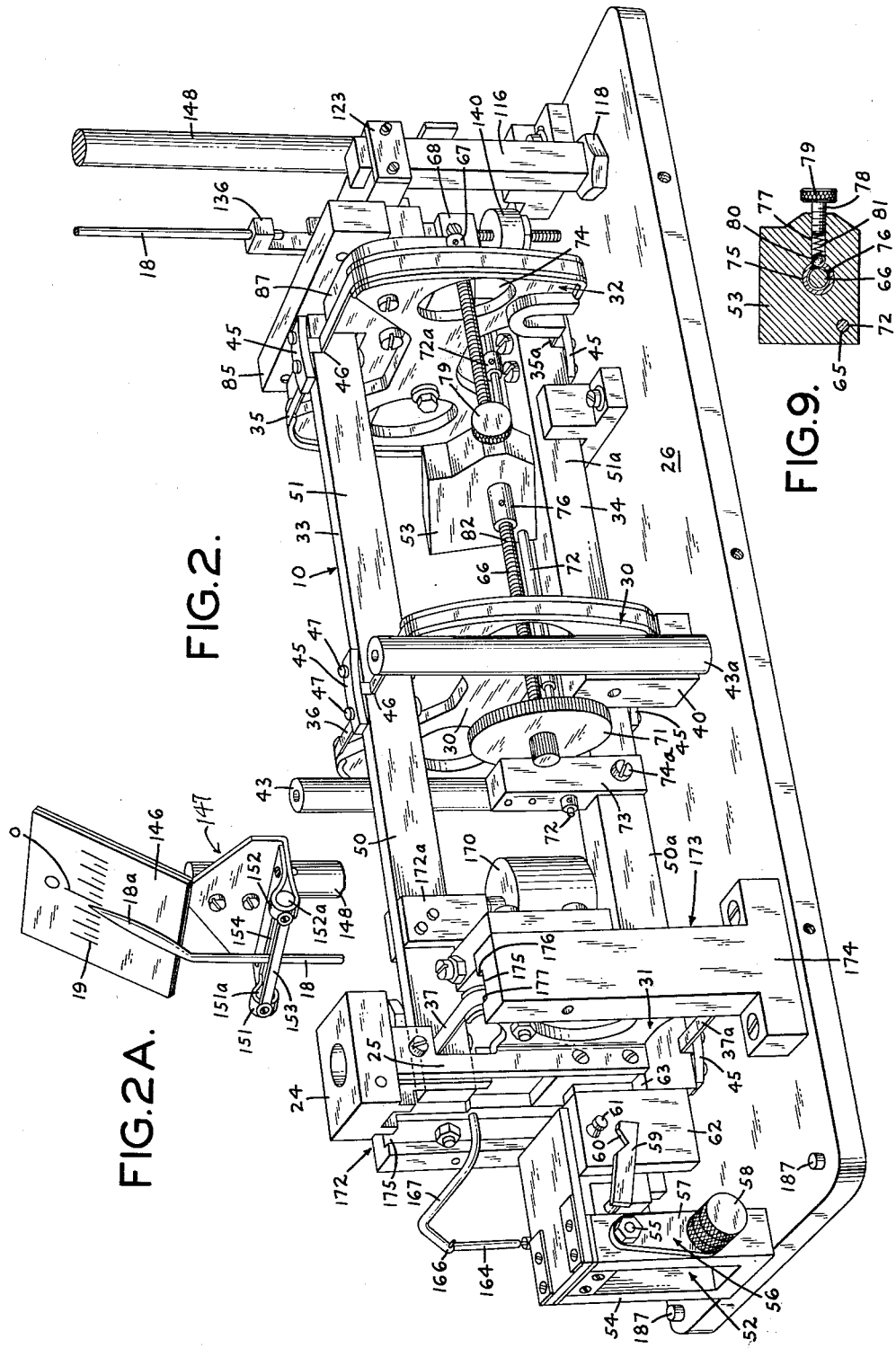

Jan. 29, 1963 R. L. RICHARDSON 3,075,597
TORSION BALANCE HAVING MECHANICALLY AMPLIFIED INDICATOR
Filed Aug. 3, 1960 4 Sheets-Sheet 3

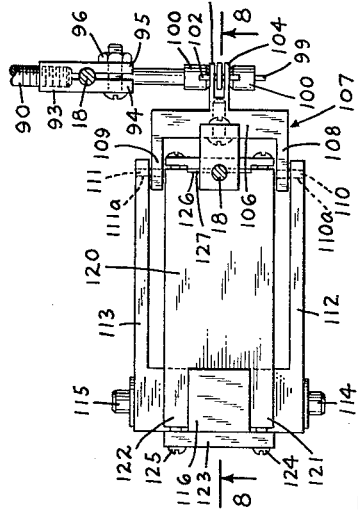

3,075,597
TORSION BALANCE HAVING MECHANICALLY AMPLIFIED INDICATOR
Robert Lyle Richardson, Glen Rock, N.J., assignor to The Torsion Balance Company, Clifton, N.J., a corporation of New York
Filed Aug. 3, 1960, Ser. No. 47,209
17 Claims. (Cl. 177—172)

This invention relates generally to torsion balances and more particularly to the type of balance frequently referred to as a checkweighing balance although it may be used for other weighing purposes. Still more particularly the invention relates to a torsion balance having a mechanically amplified indicator mechanism.

According to this invention a torsion balance is provided with a mechanism attached to and movable in response to movement of the balance skeleton so that such movement of the skeleton is amplified by the mechanical arrangement to impart an amplified movement of an indicator pointer with reference to a fixed index or indicator scale. That is, a torsion balance is provided which has a mechanical pointer and mounting assembly which amplifies the movement of the skeleton about its middle truss axis and causes the pointer to move over a fixed index scale to indicate visibly and clearly the weight of an unknown or to indicate that an unknown weight or mass being weighed on the balance is over or under a predetermined weight.

In order to provide a checkweighing torsion balance which will indicate accurately over, under, or balance at a predetermined weight by a mechanical amplifying system of the pointer type, various adjustments and correcting devices are desirable. This invention provides a checkweighing torsion balance, so devised and adjustable that a pointer mounted for movement about an axis of rotation is connected through an amplifying linkage to a movable part of the skeleton such as a truss or beam, and preferably, but not necessarily, at the end of the skeleton, whereby the movement of the skeleton within its amplitude of movement is translated to the pointer system and the pointer finger movement amplified so that the movement of the skeleton is measured by the movement of the pointer finger over a fixed and clearly visible index scale, the reading on the scale being indicated in such magnitude as to be quickly read and interpreted by the operator.

Although the novel features which are believed to be characteristic of the invention are pointed out in the annexed claims, the invention itself as to its objects and advantages and the manner in which it may be carried out may be better understood by reference to the following more detailed description taken in connection with the accompanying drawings showing an illustrative embodiment and forming a part hereof in which:

FIG. 1 is a perspective view of the balance;

FIG. 2 is a perspective view of the balance with the casing removed to show the skeleton and other mechanisms, the index scale, mounting post and pointer being broken away;

FIG. 2A is a perspective view of the index scale and pointer, being that part broken away from FIG. 2;

FIG. 4 is a view in perspective of the weight-loading assembly forming a part of the balance and providing adjustment for nominal package weight or tare;

FIG. 5 is a top plan view, partly broken away, showing the pointer mounting and mechanical amplifier assembly;

FIG. 6 is a view in elevation, partly broken away, of the assembly shown in FIG. 5;

FIG. 7 is a view in elevation of the assembly shown in FIG. 6, but at right angles thereto, and as seen in FIG. 3;

FIG. 8 is a view in cross section taken on line 8—8 of FIG. 5; and

FIG. 9 is a view in cross section of a weight-adjusting detail.

Figure 3:
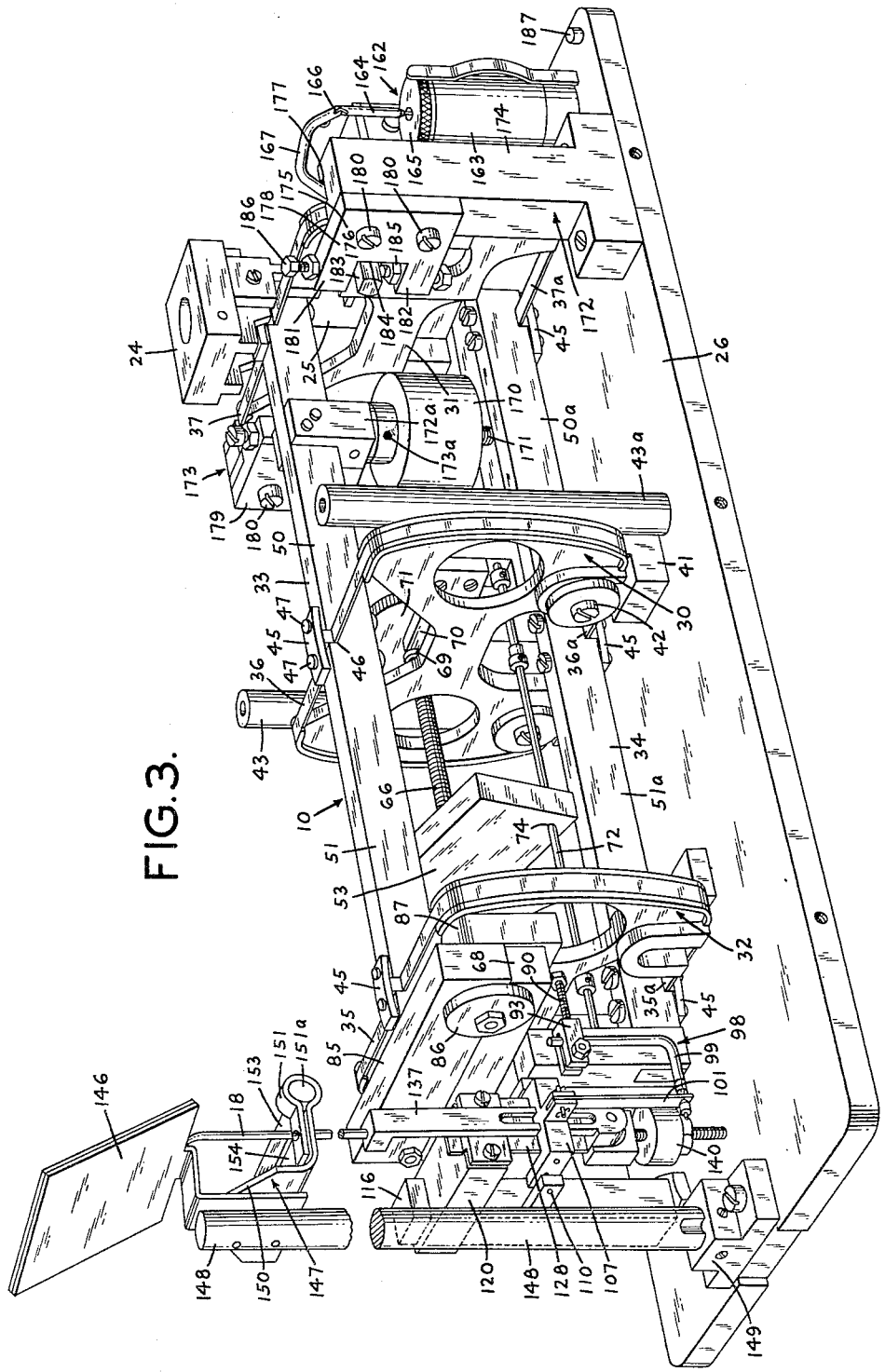
FIG. 3 is a perspective view similar to the FIG. 2 viewed from the diagonally opposite corner.

Referring now to the drawings in which like reference characters indicate like parts throughout the several views, the balance as it appears when ready for use and as illustrated in FIG. 1 comprises a skeleton 10 (not seen in FIG. 1; see FIGS. 2, 3) mounted in a housing or casing 11 having front and rear walls 12, 13; side walls 14, 15, top wall 16 and a vertically extending hollow closure 17 which encloses the pointer rod 18 and index scale 19 and its mounting post. A transparent window 17a is provided in the closure 17. The front corners of the casing are provided with normally closed hinged corner doors 20, 21 and hinged side door 22, which are openable to provide access to adjustable mechanisms on the skeleton 10 mounted within the casing. A weighing platform 23 is removably mounted on an adapter 24 secured to post 25 extending through top wall 16 of the housing secured to the skeleton (later to be described). The weighing pan is located in a position readily accessible to the operator. The casing is mounted on a base 26 on which the skeleton is mounted. A handle 27 is provided for lifting and carrying the balance.

The skeleton 10 comprises a middle truss 30, fixedly mounted on the base 26, end trusses 31 and 32 and upper beam 33 mounted on truss band portions 35, 36, 37 and lower beam 34, mounted on lower band portions 35a, 36a and 37a.

The middle truss 30 is fixedly secured to the base 26 by means of mounting blocks 40, 41, the truss being held in place by screws 42 extending through the wing of the truss. Vertical posts 43, 43a, having threaded bores in their top ends to receive screws 44 provide means for mounting the handle 27. The housing 11 is secured to the base by screws 44a.

The beams 33, 34 of the skeleton are secured to the truss bands by means of clamping members 45 which clamp the truss bands in cross grooves 46. Screws 47 clamp the members 45 to the beams. All clamp members 45 may be of the same construction. Inasmuch as the end trusses 31, 32 are secured only to their respective truss bands at the ends of the beams and not fixedly secured to the base as is the middle truss 30, the skeleton 10 is free to rotate about the middle truss bands 36, 36a as fulcrum points, but within a limited range of amplitude; there being suitable stop members fixed to the base to limit the amount of rotation of the skeleton in either direction about its axis, particularly if an excess weight is placed on the weight pan 23 of the balance. Although the middle truss 30 is often referred to as the center truss or intermediate truss, and although it will be understood that conventionally it has been customary to center the intermediate truss between the end trusses, this is not necessarily the case in the torsion balance embodying my invention. The lever arms 50, 51 of the upper beam 33 on each side of the intermediate truss 30 and the corresponding lever arms 50a, 51a of the lower beam 34 on each side of the truss 30 may be made so that the lever arms on either side of the truss 30 may be adjusted to either lengthen or shorten the effective lever arms on each side of their fulcrum points which are at the bands of the intermediate truss 30. Such adjustment may be desirable to make a correction for sag of the skeleton due to load application on the weighing pan of the balance.

When weights are applied to the skeleton of a torsion balance, there is a certain sag due to elasticity of the supporting bands, the amount of which will, of course, vary as the load is varied. If the indicator mechanism is attached or taken off at a place away from the center of the lengths of the beams, or at the center of the length of the beam, there will be a deflection of the pointer and an apparent change in the zero point due to sag and the amount of deflection will vary with the change in load. A correction for this may be made by purposely making unequal the two arm lengths of the beams on either side of the middle truss bands. That is, the lengths of the lever arms 50, 50a are made greater or less than the lengths of lever arms 51, 51a and by such an amount that when equal weights are put on the end trusses 31, 32 (or their weight pans or their weight-carrying devices), the inequality in the lever arm lengths will cause a rotation of the skeleton of the same order of magnitude as the vertical sag produced by these same loads but the correction is made so that, in effect, it is applied in the opposite direction to that resulting from the sag produced by the weights. The adjustment in arm lengths is made to produce a rotation of the skeleton of such a magnitude as to cause the end truss to move vertically the same amount as that motion which results from sag of the skeleton in the opposite direction. The net result is that the indicator remains at zero (0), within the capacity or range of the balance despite varying loads applied or weighed in the weighing operations.

Adjustment means are provided for the adjustment of the balance to a nominal package weight. These are, first, a movable weight mass member 53 mounted on the skeleton for movement longitudinally of the skeleton beams 33, 34; this weight member being mounted for fine and delicate adjustment, and second, a weight-loading assembly 52 mounted on the base at the front end (in this instance, the weight pan end). These two weight adjustments are provided so that the index pointer may be caused to register zero (0) for any predetermined fixed weight placed upon the weighing pan 23, within the range of the weighing capacity of the balance. Also, a weight bar 85 (mentioned later) is secured to the end truss 32.

The weight adjustment assembly 52 for a secondary adjustment (sometimes referred to herein also as a "coarse" adjustment) comprises an upstanding standard 54 mounting a rotatable shaft 55 which may be turned on its axis by a crank 56 having a link 57 secured at one end to the shaft 55 and having a knurled hand knob 58 at its other end. Turning of the crank 56 will cause movement of the notched arm 59 causing the notch 60 to engage a pin 61 secured to a weight member 62 of predetermined mass. By turning the crank 56 the arm 59 can be made to engage pin 61 and lift the weight 62 upwardly so that it rests upon the arm 59 and will not bear upon the skeleton; or the crank may be turned to move the arm 59 downwardly and disengage it from the pin 61 and hence weight 62. This will cause the weight 62 to rest upon a bracket 63 secured to the end truss 31 and thereby place its weight upon the end truss to exert its force on the skeleton in a direction to cause it to rotate about its middle truss fulcrum. This weight assembly 52 is for adjustment which may be considered a secondary adjustment which may be used in conjunction with the primary adjustment described later and provides the balance with a capacity over a materially wider range.

The other weight-adjusting means (herein referred to for convenience of description as the primary adjustment) comprises a weight 53 movable lengthwise on a horizontally positioned threaded rod 66 mounted for rotation on its long axis in an outer end bearing 67 fixed on a cross-piece mounting bracket secured to a block 74 on lower beam 34, and an inner cross-piece bracket 69 secured to a mounting block 73 fixed to the lower beam 34. A milled hand knob 71 is fixed to the inner end of the threaded rod 66. A guide rod 72 having adjustable limit stops 72a is mounted parallel with threaded rod 66. It is secured at its inner end in mounting block 73 secured to the lower beam 34 by means of a screw 74a and the guide rod 72 is secured at its outer end in a similar block 74 on the outer end portion of beam 34. The weight 53 is mounted to move in an axial direction on threaded rod 66, the guide rod 72 extending through a hole 65 in the weight member; it being understood that the weight 53 is slidable on the rod 72. The means mounting the weight 53 for fine adjustment on threaded rod 66 comprises a bore 75 in the member 53 and a guide sleeve 76. At right angles to bore 75, through the weight block 53 is a threaded bore 77 (see FIG. 9) in which is mounted a threaded screw 78 having a knurled knob 79. A small ball 80 in bore 77 is yieldingly pressed toward the threaded shaft 66 by a compression spring 81. The ball is of a size to ride in the helical valley of the thread but the spring 81 is such as to permit the ball 80 to ratchet over the crests of the thread 82 by merely sliding the weight 53 manually to right or left. But for very fine adjustment the knob 71 may be rotated by hand to turn rod 66 on its axis and the spring-pressed ball will engage the valley of the thread to cause the weight 53 to move laterally thread by thread for very accurate adjustment of the weight.

Thus, for example, if a ten ounce package is to be weighed on platter 23, a known ten ounces of weight are placed on the platter and the weights 62 and 53 are so adjusted that the pointer finger 18a on pointer rod 18 will come opposite to or in registry with the zero (0) mark 0 on the graduated index scale 19.

A still third counterbalance mass comprising a weight bar 85 is mounted on a bracket 68 on end truss 32. This mass 85, secured in place by a ring and screw 86 and is fastened to a bracket 87 fixed on end truss 32. This mass brings the skeleton essentially to an equilibrium position in the condition conforming to the minimum specification for weight capacity on the weighing platter 23.

Means are provided for translating the movement of the skeleton 10 about its middle truss fulcrum points during a weighing operation into pointer movement which can be read against a fixed index, such as scale 19. As shown, this mechanism (herein sometimes referred to as a "mechanical amplifier" for convenience of description) comprises an arrangement for suspending the pointer rod 18 so that its pointer finger 18a will swing or oscillate over the scale either to right or left of the center zero index 0 depending upon whether the weight placed on pan 23 is over or under the predetermined amount of weight for which the balance is adjusted to checkweigh. A threaded actuating arm 90 is secured to end truss 32 and extends outwardly and laterally from the truss, the arm 90 extending through a bore in the truss 32 and adjustably and securely fastened by nuts 91, 92. Threaded on the arm 90 is a threaded nut 93 which is bifurcated to provide clamp arms 94, 95 which may be adjustably clamped toward each other by means of bolt and nut 96. The split arms are provided with semi-circular cutouts through which vertically extends the vertical leg 97 of an L-shaped arm 98, the horizontal leg 99 of which extends outwardly in a vertical plane through the axis of arm 90. Pivotally secured at its lower end to the outer end of horizontal leg 99, between adjustable stops 100 is a vertically extending link 101. The upper end of link 101 is pivotally secured on a pin 102 extending through the arms 103, 104 of a bifurcated bracket 105 extending outwardly from the cross-piece 106 of a U-shaped pointer holder bracket 107 having legs 108, 109. The legs 108, 109 of the pointer holder bracket have outwardly extending pins 110, 111. These pins, herein called limit stop pins, extend into registering apertures 110a, 111a in bracket arms 112, 113 which are horizontally disposed in parallel spaced relation and supported by a vertically disposed post 116. The outer ends of these arms 112, 113, are secured by means of screws 114, 115, threaded into the vertically disposed post 116 which is secured at its lower end to the balance base 26. The lower end of the post 116 terminates in a threaded shank 117 extending into a threaded bore in the base and locked in adjusted position by lock nut 118. The apertures 110a, 111a, are larger than the cross sections of the pins 110, 111, so that these pins, in effect, "float" in the apertures 110a, 111a. But the walls of the apertures serve as limit stops for the pins 110, 111 to prevent undue movement of the pointer mounting elements in case the balance is subjected to shock or undue vibration. Also the apertures 110a, 111a are adjustable up and down, by adjustment of arms 112, 113 to make certain the pins are normally positioned to extend into the apertures 110a, 111a without contact therewith. It has been pointed out that the diameter of the apertures 110a, 111a is slightly greater than the diameter of the pins 110, 111.

Extending laterally from the post 116 from a place above the arms 112, 113 is a flexible flat band-holding bracket arm 120. This band-holding arm 120 is cut out to provide two arms, 121, 122 at its outer end to fit around the square post 116. The arms are clamped in vertically adjusted position to the post by a clamp plate 123 secured to the arms 121, 122 by means of threaded screws 124, 125. The inner end of band-holding arm 120 is provided with a shallow vertical channel 126.

Mounted in the channel 126 is the upper end portion 127 of a length of flexible flat steel band or ribbon stock, preferably of spring steel stock. The plate member 128 of flat stock (herein called a "flexure plate") is clamped at its upper end in its suspending position in the channel 126 by means of a clamp plate 129 held in clamped position by means of threaded screws 130, 131 screwed into suitable threaded bores in the end of arm 120.

Secured to the bottom end portion 132 of the suspended flexure plate 128 is a clamp block 133 secured by means of clamping screw 134 to the lower stub arm 135 of an upstanding pointer holder 136. This pointer holder member 136 has a long leg portion 137 from which extends a lower stub arm 135 from the bottom end and an upper stub arm 136, from the upper end. The lower end portion of flexure plate 128 is clamped between stub arm 135 and clamp block 133 by means of clamp screw 134. Depending from the clamp block 133 is a threaded shank 139 upon which is threaded an adjustable center-of-mass weight 140 which may be locked in any desired vertically adjustable position on shank 139 by threaded nut 141. Mounted in a vertical bore 142 in stub arm 136 is the lower end of pointer rod 18, held in place by a set screw 143 extending through the stub arm 136. The center-of-mass weight 140 may be adjusted on the threaded shank 139 so as to independently bring the center of gravity of the pointer mechanism assembly (the mechanical amplifier) at the effective point of rotation of the pointer device which is at or near the center 145 of the depending unsupported portion or length of the flexure plate 128. The pointer holder member 136 has a vertical slot 155 in its leg 137, which provides guide rails 156, 157 on each side of the slot. These guide rails fit slidably into registering guide channels in the cross-piece 106 of the pivoted yoke member 107. A set screw 160 having a washer 161 under its head and threaded into a bore in the cross-piece 106 (see FIG. 8) provides means for clamping the pointer holder 136 in any desired vertically adjusted position on the yoke 107, within the limits of the slot 155.

Now it will be seen that the flexure plate 128 which is secured at its upper end to arm 120 supports the pointer mechanism and the apertures 110a, 111a are so adjusted that the pins 110, 111 extend into the apertures, but out of contact; these pins serving as limit stops in the event of undue vibration or shock to the balance. The axis of rotation of the pointer is at point 145 which is approximately midway of the length of the flexure plate 128.

The index scale 19 is mounted on a plate 146, in turn mounted on a bracket 147 secured to the upper end portion of a vertical post 148 fixed at its bottom end to a mounting block 149 secured to the base. A stop device comprising a back plate 150, two supporting arms 151, 152 and a front guard rod 153 provides a slot or guideway 154 in which the pointer rod may oscillate within the limits of the stop arms 151, 152. There are rubber bumper pads 151a, 152a, mounted in the arms 151, 152 to reduce pointer vibration and bounce at each end of the pointer travel.

In the weighing operation there is rotational movement of the skeleton about the middle truss bands as an axis of rotation. Movement up and down of the truss 32 which comes about, for example, from the weighing operation wall cause a corresponding movement up or down of the fixed arm and hence the leg 99 of L-shaped arm 98. This will cause a corresponding vertical movement of pivoted link 101 and a corresponding movement of the yoke 107 about the center of rotation of the flexure plate 128. This will result in a corresponding rotation of the pointer holder 136 about its rotational axis which is the point 145 on the flexure plate 128 which is at or approximately at midway between the unsupported depending portion of the flexure plate. This will cause a corresponding amplified movement across the scale 19 of the pointer rod finger 18a; the ratio of the amount of movement of the pointer finger with reference to the movement of the truss 32 being in the ratio of the length of the pointer from its center of rotation 145 and the pointer finger 18a to the distance between link pivot 102 and center of rotation 145 of the flexure plate. Hence, the arrangement provides means for indicating weight, either over or under a given weight, placed on pan 23, the divisions of scale 19 being calibrated to indicate increments of weight. And the scale may be made sufficiently large and the amplitude of oscillation of pointer finger 18a is sufficiently great that accurate and quick reading with the naked eye is greatly facilitated.

The motion of the entire balance and pointer system is effectively damped by the hydraulic damper 162. This damper arrangement comprises a dash pot which may be a conventional cylinder 163 secured to the base 26. A piston is mounted for reciprocation in a liquid bath, such as oil, in the cylinder; a piston rod 164 fixed to the piston head being vertically reciprocatable through an aperture in the cap 165 which covers the cylinder. The upper end of the piston rod is pivotally connected to the outer end 166 of a bent rigid arm 167, the inner end of which is fixed to truss 31. Hence movement of the skeleton 10 about its middle truss fulcrum is translated to rigid arm 167 and hence to the piston rod and piston head which moves in the oil bath in the cylinder 163. This damper offers a force opposite to the unbalanced force which causes the skeleton to move, so that the skeleton arrives at its rest point quickly and without undue or prolonged oscillation.

To assure that the skeleton assembly has its center of mass coincident with its points of rotation, namely the upper and lower truss bands, a relatively heavy mass, herein shown as a heavy metal cylinder 170, is vertically adjustable on a threaded rod 171 depending from a mounting bracket 172a secured to the upper beam intermediate trusses 30 and 31. A set screw 173a may be used to clamp the center-of-mass adjusting weight 170. By adjusting this center-of-mass weight vertically on rod 171, the mass center of the whole skeleton assembly may be adjusted. The result of such adjustment is that when the center of gravity of the balance assembly is adjusted to its proper place, the balance will weigh accurately even though the base plate of the balance is not setting level or is tipped to a position "out of level," as there will be no influencing effect on the balance structure causing the pointer to vary from its rest point. Likewise, the center-of-mass weight 140 on the pointer mechanism assembly allows for adjustment of the mass center of the pointer assembly only, such that it too has its center of mass essentially at its effective point of rotation, which, as mentioned above, is at a point 145 approximately at the center of the unsupported length of flexure plate 128.

The balance is provided with means for preventing undue twist of the skeleton about its central vertical axis and also for preventing undue movement or rotation of the skeleton about the bands of the middle truss. To prevent unwanted twisting of the skeleton, due to weights used during the weighing operations or for other cause, that is, to prevent a movement or rotation of the skeleton about a vertical axis through the center of the middle truss, a pair of guide members 172, 173 are provided. These guide members 172, 173, one on each side of truss 31 at the weigh pan end of the balance, each comprises a vertically disposed post 174 secured at its bottom end to base 26. Each post has a vertical channel 175 at the side adjacent the end of the truss which forms a guideway in which the end of the truss may move up and down. The side walls 176, 177 of the channel form stop members to prevent the truss 31 from twisting or rotating about a vertical axis through the center of truss 31 and hence prevent a twisting of the skeleton. It will be understood that there is a pair of such channel guideways; one on each post 172, 173 at each end of the truss 31.

Secured to each post 172, 173 at their upper ends is an adjustable limiting stop arrangement for limiting the range or amplitude of movement of the end truss 31 in a vertical direction; that is to prevent over-travel of the skeleton or undue rotation of the skeleton about the middle truss fulcrums. This adjustable stop device for limiting the range of vertical movement of truss 31 comprises a pair of blocks 178, 179 mounted to the upper ends of posts 172, 173 as by screws 180. These two stop members being the same in construction it will suffice to describe the details of one of them. The stop member comprises a block 178 cut out to form two inwardly extending arms 181, 182. A contact arm 183 extends laterally from truss 31 and within the cut-out portion 184 of the block. A pair of vertical adjustable screws 185, 186 are mounted in threaded bores in the arms 181, 182. Hence, by vertical adjustment of screws 185, 186 the range of up and down movement of the contact arm 183 and hence truss 31 is limited to the distance of the gap between the set screws 185, 186. Thus the skeleton is protected from over-travel if a weight too heavy for the capacity of the balance is placed on the weighing pan 23. The balance has three feet 187 on which the base rests. Although, as shown, the feet are not adjustable, it may be desirable, in some instances, to provide vertically adjustable feet.

The balance may be operated for checkweighing as follows: Assume that it is desired to weigh a number of consecutive separate packages, each to contain 10 ounces of a powder material from a common source. First, a ten-ounce weight plus the weight of an empty package is placed on the weigh pan 23. Then a rough adjustment to bring the pointer finger 18a opposite the zero (0) mark in the center of index scale 19 is made by the coarse adjustment assembly 52 which is accessible through doors 20, 21. Then a fine adjustment is made to bring the pointer finger to the zero (0) by the fine adjustment assembly by moving the weight 53 along the threaded rod 66, this assembly being accessible through door 22.

Then the weights are moved from the pan and the package containing the material is placed on the pan. If the weight of the contents of the package is more than the wanted 10 ounces the pointer finger will move to the right of the zero mark on the index scale by the amount of overweight; the scale having been calibrated to indicate a given increment for each division in fractions of a unit of weight. Material is removed from the package until the finger pointer reaches the zero mark which represents 10 ounces of material in the package. If the packaged material is under 10 ounces then the finger pointer moves to the left of the zero (0) mark by the number of divisions or increments the package is underweight. Sufficient material is added to bring the pointer finger 18a opposite the zero mark. This indicates that 10 ounces is now in the package. It will be manifest that the operation is repeated for consecutive packages intended to contain the same weight of material.

The embodiment, as shown in the drawings, is ordinarily termed an end-to-end balance having the weighing platter toward the front and the pointer to the rear as seen in FIG. 1. This balance may also be visualized as being side-to-side, as in conventional practice with the weighing pan to one side. Also, the balance may be supplied with other forms of weight-adjusting devices while retaining the advantages of the mechanical amplifier pointer arrangement.

The terms and expressions which have been employed herein are used as terms of description and not of limitation, and there is no intention, in the use of such terms and expressions, of excluding any equivalents of the features shown and described or portions thereof, but it is recognized that various modifications are possible within the scope of the invention claimed.

What is claimed is:

1. A torsion balance which comprises a base, a skeleton, and a weight indicator, said skeleton comprising a pair of parallel beams consisting of an upper and a lower beam, a middle truss fixedly mounted on said base and having on each of two opposite sides a torsion band consisting of an upper fulcrum band and a lower fulcrum band about which said skeleton is rotatable, said upper and lower beams being connected intermediate their ends to said upper and lower fulcrum bands respectively, a pair of end trusses each having an upper and a lower torsion band to which the end portions of said beams are secured; said weight indicator comprising an index scale, an indicator pointer mounted for swinging movement across said scale in response to rotational movement of said skeleton about said fulcrum bands, and a mechanical amplifier system; said mechanical amplifier system comprising a flexible flexure plate, flexure plate mounting means connected to said base and mounting said flexure plate in suspended position from a fixed point at the upper end portion of said flexure plate, the suspended portion of said flexure plate below said fixed point being free to flex, linked arms connecting the lower flexing free end portion of said flexure plate to said skeleton and translating the rotational movement of said skeleton about said fulcrum bands to said flexing portion of said flexure plate, said flexure plate supporting the weight of said pointer and, upon rotation of said skeleton, said pointer rotating about a center of rotation which extends through the said suspended flexing portion of said flexure plate in a direction through the plane of said flexure plate and perpendicular to the vertical axis of said flexure plate.

2. A torsion balance which comprises a base; a skeleton; and mechanically amplified indicator system; said skeleton comprising a middle truss fixedly mounted on said base having an upper and a lower torsion band, two end trusses having upper and lower torsion bands, an upper and a lower beam mounted on said middle truss bands intermediate the ends of said beams for rotation of said skeleton about said middle truss bands as fulcrum points, said beams at their ends being secured to said end truss bands; said mechanically amplified indicator system comprising a flat elongate flexure plate, means connected to said base fixedly mounting the upper end portion of said flexure plate in fixed position with the lower end portion of said flexure plate suspended vertically and free to flex, an index scale, pointer means having a base end connected to the suspended flexing portion of said flexible plate, said pointer means being mounted for rotation about an axis extending through the plane of the flexing portion of said plate and perpendicular to its long axis and having a pointer finger movable over said scale; and mechanical linkage connecting said pointer means and skeleton, said mechanical linkage translating the rotational movement of said skeleton to amplified rotational movement of said pointer means about its axis of rotation through said flexure plate, so that the amplitude of movement of said pointer finger over said scale is greater than the amplitude of rotational movement of said skeleton at the point of attachment of said linkage to said skeleton.

3. A torsion balance constructed according to claim 1 in which said mechanically amplified indicator system comprises a rigid arm secured to said skeleton, a yoke-like member, means connecting said yoke-like member to the flexing portion of said flexure plate, link bar means pivotally connecting said yoke-like member to said rigid arm, and means connecting said pointer means to said yoke-like member, said flexure plate providing a rotational axis intermediate its fixed and free ends for rotation thereabout of said pointer means.

4. A torsion balance constructed according to claim 3 having an adjustable weight mass secured to said flexure plate to adjust the position of the center of gravity of said mechanically amplified indicator system and limit stop pins connected to said yoke-like member.

5. A torsion balance constructed according to claim 1 and including weight adjustment means comprising a threaded rod mounted on said skeleton for rotation, a weight mass mounted on said threaded rod and movable in a direction toward and away from one of said end trusses in response to rotation of said threaded rod about its longitudinal axis.

6. A torsion balance constructed according to claim 5 including a second weight adjustment means comprising a second weight mass, means mounting said second weight mass operative by hand manipulation selectively to move said second weight mass to a position where it rests upon one of said end trusses and to move said second weight mass to a position where it is free of that said end truss.

7. A torsion balance constructed according to claim 3 in which a weight is suspended from the suspended flexing portion of the flexure plate and is vertically adjustable to change the center of gravity of said mechanically amplified indicator system.

8. A torsion balance constructed according to claim 7 in which a bracket is secured to one of said beams and a weight is mounted on said bracket for vertical adjustment to change the center of gravity of said skeleton thereby to eliminate errors in said balance that may be caused by an off-level positioning of said base.

9. A torsion balance constructed according to claim 8 which includes limit stop members mounted on said base for limiting the amplitude of rotation of said skeleton about a vertical axis through said middle truss and about a horizontal axis through said middle truss.

10. A balance constructed according to claim 1 in which said balance is provided with a first balance adjusting means which includes a rotatable threaded rod mounted on said skeleton for rotation on its long axis, and a weight mass mounted for movement longitudinally on said rod in response to rotation of said rod.

11. A torsion balance constructed according to claim 10 in which said balance includes a second adjusting means comprising means for mounting a coarse weight, said weight mounting means having manually operable arms movable to a position to hold said coarse weight free of said skeleton and to move said coarse weight to a position resting on said skeleton.

12. A torsion balance according to claim 10 in which said weight mass includes a first bore through which said threaded rod passes and a second bore at right angles to said first bore, a spring-pressed ball within said second bore engaging the valley of the thread on said rod and means to adjust the spring pressure on said ball whereby said ball will ratchet over said thread upon direct manual movement of said weight mass longitudinally on said rod and whereby said weight mass may be moved longitudinally thread-by-thread by turning said rod on its axis.

13. A torsion balance, which comprises a base, and a skeleton comprising a pair of parallel beams consisting of an upper beam and a lower beam, a middle truss fixedly mounted on said base and having on each of two opposite sides a torsion band consisting of an upper fulcrum band and a lower fulcrum band about which said skeleton is rotatable, said upper and lower beams being connected to said upper and lower fulcrum bands respectively intermediate the ends of said beams at fulcrum points which are positioned a distance from the centers of the lengths of said beams to provide longer effective arm-lengths on one side of said middle truss than on the other side of said middle truss, the lengths of said arms being adjusted to provide a compensation to correct for load deflection error in said balance, a pair of end trusses each having an upper and a lower torsion band to which the end portions of said beams are secured, an index scale, an indicator pointer mounted for movement across said scale in response to rotational movement of said skeleton about said fulcrum points, a mechanical amplifier system, said amplifier system comprising a flexure plate, means fixedly mounting said flexure plate at its upper end portion so that the lower end portion thereof is suspended and free to flex, linkage connected to said skeleton at a place distant from said middle truss and to said flexing portion of said flexure plate, for translating the rotational movement of said skeleton to said pointer.

14. A torsion balance constructed according to claim 13 in which said mechanical amplifier system comprises a flexure plate support, a flexure plate suspended at its upper end from said support, a yoke support, a yoke secured to said yoke support, means securing said yoke support at its upper end to said pointer, means securing said yoke support at its lower end to the lower end of said flexure plate, and limit stop means on said yoke, permitting said pointer to rotate about an axis through said flexure plate, and in which said linkage includes a link bar pivoted at one end to said yoke, and at the other to an arm fixed to one of said end trusses.

15. A torsion balance constructed according to claim 14, in which a vertically adjustable weight is suspended from the lower end of said flexure plate for adjusting the center of gravity of said mechanical amplifier system.

16. A torsion balance constructed according to claim 15 in which adjustable means are provided to change the center of gravity of said skeleton and adjustable weight compensating means is mounted for movement longitudinally on said skeleton to balance said skeleton to cause said pointer to read zero on said index scale for each different nominal package weight to be weighed on said balance.

17. A torsion balance constructed according to claim 16 in which a secondary weight means is mounted at one end of the balance skeleton to increase the range of weights capable of being weighed on said balance.

References Cited in the file of this patent

UNITED STATES PATENTS

| | | |
|---|---|---|
| 1,169,929 | Conway | Feb. 1, 1916 |
| 1,719,734 | Smith | July 2, 1929 |
| 1,864,565 | Walker | June 28, 1932 |
| 1,891,762 | Hallwood | Dec. 20, 1932 |
| 1,894,442 | Flanagan | Jan. 17, 1933 |
| 2,937,863 | Hadley | May 24, 1960 |